US006277445B1

United States Patent
Hasegawa et al.

(10) Patent No.: US 6,277,445 B1
(45) Date of Patent: Aug. 21, 2001

(54) ORGANOPOLYSILOXANE COMPOUND AND COMPOSITION CONTAINING THE SAME

(75) Inventors: Kouhei Hasegawa, deceased, late of Gunma-ken, by Hiroko Hasegawa, legal succesor; Motohiko Hirai; Satoshi Kuwata, both of Gunma-ken, all of (JP)

(73) Assignee: Shin-Etsu Chemical Co., Ltd. (JP)

( * ) Notice: Subject to any disclaimer, the term of this patent is extended or adjusted under 35 U.S.C. 154(b) by 0 days.

(21) Appl. No.: 09/415,222

(22) Filed: Oct. 12, 1999

(30) Foreign Application Priority Data

Oct. 12, 1998 (JP) .................................................. 10-289509

(51) Int. Cl.⁷ ....................................................... B05D 3/02
(52) U.S. Cl. .......................... 427/387; 524/837; 524/838; 528/26
(58) Field of Search ............................... 528/26; 524/837, 524/838; 427/387

(56) References Cited

U.S. PATENT DOCUMENTS 5,025,076 * 6/1991 Tanaka et al. .
5,302,659 * 4/1994 Bindl et al. .
5,540,952 * 7/1996 Canivenc et al. .

FOREIGN PATENT DOCUMENTS

95676 * 7/1983 (EP) .

OTHER PUBLICATIONS

"Merriam Webster's Collegiate Dictionary, Tenth Edition", 1999, Merriam–Webster Incorporated, Springfield MA.*

* cited by examiner

Primary Examiner—Robert Dawson
Assistant Examiner—Marc S. Zimmer
(74) Attorney, Agent, or Firm—Millen, White, Zelano & Branigan, P.C.

(57) ABSTRACT

Disclosed is a novel modified organopolysiloxane compound characteristically having carboxylalk(en)ylcarbonyl groups substituting for the hydrogen atoms on the N atoms in an aminoalkyl group-containing organopolysiloxane as introduced by the reaction of a dicarboxylic acid anhydride such as maleic anhydride and succinic anhydride with an aminoalkyl group-containing organopolysiloxane. This modified organopolysiloxane compound serves as a principal ingredient in an aqueous emulsion composition for a finishing treatment of various fabric material to impart excellent touch feeling of softness to the fabric material with little problem of yellowing of the fabric material unavoidable with conventional aminoalkyl group-containing organopolysiloxane compounds. The inventive modified organopolysiloxane compound in the form of an aqueous emulsion is also useful for a waterproofing treatment of paperboards for plasterboards to serve as a covering sheet on the core board of hydrated gypsum.

2 Claims, No Drawings

ORGANOPOLYSILOXANE COMPOUND AND COMPOSITION CONTAINING THE SAME

BACKGROUND OF THE INVENTION

The present invention relates to a novel organopolysiloxane compound and a composition containing the same as a principal ingredient suitable for use as a fabric-finishing agent or waterproofing agent capable of imparting excellent softness in touch feeling to a fabric material and resistance against yellowing as well as waterproofness to cellulosic materials including paperboards treated therewith to serve as a covering of plasterboards.

It is an established prior art technology that fabric materials in general can be imparted with softness and smoothness or slipperiness in touch feeling by a treatment with a fabric-finishing agent containing an organopolysiloxane compound including dimethylpolysiloxanes, epoxy group-containing organopolysiloxanes, aminoalkyl group-containing organopolysiloxanes and the like. In respect of the high softness in touch feeling imparted to the fabric material treated with the fabric-finishing agent, those formulated with an aminoalkyl-containing organopolysiloxane are preferred and those of which the aminoalkyl group in the aminoalkyl-containing organopolysiloxane compound is a 3-aminopropyl group —$C_3H_6NH_2$, 3—(N-2-aminoethylamino)propyl group —$C_3H_6NHC_2H_4NH_2$ and the like are the most widely employed for the purpose (see Japanese Patent Publications 48-1480, 54-43614 and 57-43673, Japanese Patent Kokai 60-185879, 60-185880 and 64-61576 and elsewhere).

Aminoalkyl group-containing diorganopolysiloxanes, when used as the principal ingredient of silicone-based fabric-finishing agent, however, have a very serious disadvantage that, when a fabric material is treated with a fabric-finishing agent containing such an organopolysiloxane, the aminoalkyl groups are liable to cause degradation by the influences of heat in the drying process after the treatment or by the influences of ultraviolet light in the sunlight falling on the fabric material in the lapse of time. This problem is particularly serious when the fabric material subjected to a fabric-finishing treatment is a white-colored or light-colored one because yellowing of the fabric material proceeds as a consequence of the degradation of the aminoalkyl groups.

As a countermeasure to prevent yellowing of fabric materials treated with an aminoalkyl group-containing organopolysiloxane-based fabric-finishing agent, proposals are made for the modification of the amino groups by the reaction of the organopolysiloxane with a monocarboxylic acid anhydride or chloride (Japanese Patent Kokai 57-101076), with an epoxy compound (Japanese Patent Kokai 59-179884), with a higher fatty acid (Japanese Patent Kokai 1-306683) and with an organic carbonate compound (Japanese Patent Kokai 2-47371).

Although improvements to some extent can be expected for yellowing prevention of fabric materials treated with an aminoalkyl group-containing organopolysiloxane-based fabric-finishing agent by the application of the above mentioned prior art methods as compared with unmodified aminoalkyl group-containing organopolysiloxanes, the effectiveness is still quite insufficient and rather an adverse influence is caused in the softness and slipperiness of the fabric materials treated therewith.

Besides the above mentioned application of an organopolysiloxane-containing composition as a fabric-finishing agent, organopolysiloxane compounds are employed as a principal ingredient in a waterproofing agent for various kinds of cellulosic materials including paperboards. Cellulosic materials of a class in which a waterproofing treatment is of great significance are paperboards as a covering layer in a so-called plasterboard consumed in large quantities as a building material not only in living houses but also in office buildings. As is known, a plasterboard has a layered structure consisting of a core board of hydrated and hardened gypsum sandwiched between two multilayer-sheeted paperboards each adhesively bonded to one of the surfaces of the core board. The paperboard used in plasterboards must satisfy several requirements that the mechanical strength of the paperboard per se is high enough, that the paperboard has good moisture-proofness, that the paperboard exhibits small dimensional changes between the dried and moistened states, that good adhesive bonding can be obtained between the core board of hydrated gypsum and the paperboard, that paperboard has moderate moisture permeability, and so on, of which the requirements for moistureproofness and dimensional stability by moistening are particularly important.

It is conventionally practiced in the industry of plasterboards that the surface of a paperboard is subjected to a waterproofing treatment by using a waterproofing agent when the paperboard is desired to have improved moisture resistance and dimensional stability by moistening. Most of the waterproofing agents currently under use for this purpose contain, as a principal ingredient, a silicone oil including dimethylsilicone oils and various types of modified silicone oils which, in most cases, are used in the form of an aqueous emulsion to prepare a water-base waterproofing agent.

Use of an epoxy-modified silicone oil, such as those disclosed in U.S. Pat. No. 3,389,042, in the waterproofing treatment of paperboard materials is also not quite satisfactory for solving the problems. Use of a mercapto group-containing silicone oil, such as those disclosed in Japanese Patent Publication 56-47994, as a principal ingredient in a silicone-based waterproofing agent has a serious problem of a strongly offensive odor as an inherent property of mercapto compounds in general to cause great deterioration of the working environment even though a substantial improvement can be obtained thereby in the waterproofing effect. The inventors previously made a proposal for an improved method of waterproofing treatment of paperboards by using an aqueous emulsion of an aminoalkyl group-containing organopolysiloxane disclosed in Japanese Patent Kokai 5-42637. This method, however, is not quite suitable for practical applications due to a relatively long time before appearance of a full waterproofing effect even though the improvement ultimately accomplished therewith is quite substantial.

SUMMARY OF THE INVENTION

The present invention accordingly has an object to provide a novel organopolysiloxane compound which can be used as a principal ingredient in a silicone-based fabric-finishing or waterproofing agent as well as a novel and improved method for a finishing treatment of a fabric material and a method for a waterproofing treatment of a paperboard for plasterboards by using a composition containing the above mentioned novel organopolysiloxane compound as a principal ingredient thereof without the above described problems and disadvantages unavoidable with conventional silicone-based fabric-finishing and waterproofing agents.

Thus, the novel organopolysiloxane compound provided by the present invention, which has a viscosity in the range from 100 to 1,000,000 centistokes at 25° C., has a chemical structure represented by the general formula

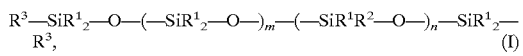
(I)

In which $R^1$ is, each independently from the others, an unsubstituted or substituted monovalent hydrocarbon group having 1 to 20 carbon atoms, $R^2$ is, each independently from the others, a monovalent organic group represented by the general formula $-R^4(NR^5CH_2CH_2)_aNR^6R^7$, $R^4$ being a divalent hydrocarbon group having 1 to 6 carbon atoms, $R^5$ and $R^6$ each being, independently from the other, a hydrogen atom, monovalent hydrocarbon group having 1 to 6 carbon atoms or $R^7$ which in turn is a monovalent organic group of the formula $-CO-R^8-CO-OH$, $R^8$ being a divalent hydrocarbon group having 2 to 10 carbon atoms, and the subscript a being 0 or a positive integer not exceeding 4, $R^3$ is a hydroxyl group, hydrocarbyloxy group having 1 to 6 carbon atoms, $R^1$ or $R^2$, the subscript m is a positive number in the range from 10 to 1000 and the subscript n is 0 or a positive number not exceeding 100 with the proviso that, when the subscript n is equal to 0, at least one of the groups denoted by $R^3$ is $R^2$.

The fabric-finishing or waterproofing agent provided by the present invention is preferably in the form of an aqueous emulsion of the above defined organopolysiloxane compound dispersed and emulsified in an aqueous medium containing a surface active agent.

DETAILED DESCRIPTION OF THE PREFERRED EMBODIMENTS

As is described above, the organopolysiloxane compound provided by the present invention has a molecular structure represented by the above given general formula (I) characteristically having at least one monovalent organic group denoted by $R^2$ which in turn is characterized by substitution of the monovalent organic group denoted by $R^7$ for a hydrogen atom or atoms on the nitrogen atoms in an aminoalkyl group.

The organopolysiloxane compound provided by the present invention is basically a diorganopolysiloxane consisting of a linear sequence of diorganosiloxane units and has a molecular structure represented by the general formula (I) given above. In this general formula, the symbol $R^1$ denotes a monovalent hydrocarbon group having 1 to 20 carbon atoms exemplified by alkyl groups such as methyl, ethyl, propyl, butyl, pentyl, hexyl, octyl, decyl, dodecyl, tetradecyl, octadecyl and eicosyl groups, alkenyl groups such as vinyl and allyl groups, aryl groups such as phenyl and tolyl groups and cycloalkyl groups such as cyclopentyl and cyclohexyl groups. These hydrocarbon groups can optionally be substituted for a part or all of the hydrogen atoms therein by halogen atoms, cyano groups and others to give a substituted hydrocarbon group such as chloromethyl, 3,3,3-trifluoropropyl, chlorophenyl and cyanomethyl groups. It is preferable that at least 90% by moles of the groups denoted by $R^1$ are methyl groups.

The group denoted by $R^2$ in the general formula (1) is a monovalent organic group represented by the general formula $-R^4(NR^5CH_2CH_2)_aNR^6R^7$. In this general formula for the group $R^2$, $R^4$ is a divalent hydrocarbon group having 1 to 6 carbon atoms such as methylene, ethylene, trimethylene and tetramethylene groups, of which trimethylene group is preferable. $R^5$ and $R^6$ in the formula are each, independently from the other, a hydrogen atom or a monovalent hydrocarbon group exemplified by alkyl groups such as methyl, ethyl, propyl, butyl, pentyl and hexyl groups, alkenyl groups such as vinyl and allyl groups, aryl groups such as phenyl group and cycloalkyl groups such as cyclopentyl and cyclohexyl groups as well as those obtained by replacing a part or all of the hydrogen atoms therein with halogen atoms or cyano groups such as chloromethyl, 3,3,3-trifluoropropyl, chlorophenyl and cyanomethyl groups. $R^5$ and $R^6$ each can be the same group as the group denoted by $R^7$ described below. It is preferable that $R^5$ and $R^6$ are each a hydrogen atom or a group $R^7$.

The group denoted by $R^7$ in the general formula (I), which is the most characteristic group in the inventive organopolysiloxane compound, is a monovalent organic group represented by the general formula $-CO-R^8-CO-OH$, in which $R^8$ is a divalent hydrocarbon group having 2 to 10 carbon atoms such as ethylene, trimethylene, tetramethylene, pentamethylene, vinylene and 1,2-phenylene groups, of which alkylene and alkenylene groups such as ethylene, trimethylene and vinylene groups are preferable. The subscript a in the general formula representing the monovalent organic group as $R^2$ is 0 or a positive integer not exceeding 4, of which 0 or 1 is preferable. The group denoted by $R^3$ in the general formula (I) at each molecular chain end of the organopolysiloxane molecules is a hydroxyl group, hydrocarbyloxy group, i.e. alkoxy or aryloxy group, having 1 to 6 carbon atoms, $R^1$ or $R^2$. The hydrocarbyloxy group is exemplified by methoxy, ethoxy, propoxy, butoxy, pentoxy, hexoxy and phenoxy groups. It is preferable that each $R^3$ is a hydroxyl, methoxy, ethoxy or methyl group or the group denoted by $R^2$. The subscript m in the general formula (I) is an average number in the range from 10 to 1000 or, preferably, from 50 to 600. The subscript n is 0 or a positive average number not exceeding 100 or, preferably, 0 or an average number not exceeding 20.

The organopolysiloxane compound of the present invention may have a viscosity in a wide range without limitations depending on the particularly intended application of the organopolysiloxane compound. When the intended application of the organopolysiloxane compound is as a principal ingredient in an aqueous emulsion composition used, in particular, for a fabric-finishing treatment of fabric materials or waterproofing treatment of paperboards, for example, the organopolysiloxane compound should have a viscosity at 25° C. in the range from 100 to 1,000,000 centistokes or, preferably, from 1000 to 300,000 centistokes. When the viscosity thereof is too low, the fabric material treated with the fabric-finishing composition cannot be imparted with full softness in touch feeling and the waterproofness of the paperboard after a treatment with the waterproofing composition is incomplete. When the viscosity is too high, on the other hand, difficulties are encountered in the preparation of the aqueous emulsion composition by emulsification of the organopolysiloxane compound in an aqueous medium containing a surface active agent.

The organopolysiloxane compound of the present invention can be prepared by the addition reaction between a conventional aminoalkyl group-containing organopolysiloxane compound and a dicarboxylic acid anhydride which can be selected, for example, from the group consisting of maleic anhydride, succinic anhydride, glutaric anhydride and phthalic anhydride though not particularly limitative thereto. The reaction can proceed either in the absence of any solvent merely by uniformly mixing the reactants or in a solution prepared by dissolving the reactants in an organic solvent.

The fabric-finishing or waterproofing composition containing the organopolysiloxane compound of the invention as the principal ingredient can be either in the form of an organic solution or in the form of an aqueous emulsion. In the preparation of an organic solution, the organopolysiloxane compound is dissolved in an organic solvent which can be selected from the group consisting of, for example, toluene, xylene, n-hexane, n-heptane, methyl ethyl ketone, methyl isobutyl ketone, ethyl acetate, butyl acetate, mineral terpene, ethyl alcohol and isopropyl alcohol though not particularly limitative thereto. In the preparation of an aqueous emulsion composition, the organopolysiloxane compound is dispersed and emulsified in an aqueous medium containing a surface active agent which is not particularly limitative relative to the ionic types of the surface activity including non-ionic, anionic, cationic and amphoteric surface active agents. Aqueous emulsions are preferred as the organopolysiloxane composition of the present invention to organic solutions.

Examples of the above mentioned non-ionic surface active agent include ethoxylated higher alcohols, ethoxylated alkylphenols, polyhydric alcohol fatty acid esters, ethoxylated polyhydric alcohol fatty acid esters, ethoxylated fatty acids, ethoxylated fatty acid amides, sorbitan fatty acid esters, ethoxylated sorbitan fatty acid esters and sucrose fatty acid esters. It is preferable that the non-ionic surface active agent has an HLB value in the range from 5 to 20 or, more preferably, from 10 to 16.

Examples of the anionic surface active agent include salts of higher alcohol sulfates, ethoxylated higher alcohol sulfates, alkylphenyl ether sulfates, ethoxylated alkylphenyl ether sulfates, alkylbenzene sulfonates, higher alcohol phosphates and ethoxylated higher alcohol phosphates.

Examples of the cationic surface active agent include higher alkyl trimethylammonium chlorides, alkylamine hydrochlorides, coconut amine acetate, alkylamine acetates and higher-alkyl dimethylphenylammonium chlorides.

Examples of the amphoteric surface active agent include N-acylamidopropyl-N,N-dimethylammoniobetaines and N-acylamidopropyl-N,N'-dimethyl-N'-2-hydroxypropylammoniobetaines.

The amount of the surface active agent used in the preparation of an aqueous emulsion composition of the inventive organopolysiloxane compound is in the range from 1 to 50 parts by weight or, preferably, from 5 to 20 parts by weight per 100 parts by weight of the organopolysiloxane compound. The amount of water as the aqueous medium in which the organopolysiloxane compound is dispersed and emulsified is such that the resultant aqueous emulsion composition contains from 10 to 80% by weight or, preferably, from 20 to 60% by weight of the organopolysiloxane compound. When the content of the organopolysiloxane compound in the aqueous emulsion composition is too low, the aqueous emulsion cannot be fully stable in storage while difficulties are encountered in the preparation of an aqueous emulsion in which the content of the organopolysiloxane compound is unduly high.

The stirrer machine used in the emulsification of the inventive organopolysiloxane compound in an aqueous medium containing a surface active agent is not particularly limitative but can be conventional including homomixers, homogenizers, colloid mills, line mixers, Universal Mixers (tradename), Ultramixers (tradename), Planetary Mixers (tradename), Combimixes (tradename) and three-roller mills without particular limitations.

It is optional that the fabric-finishing composition containing the inventive organopolysiloxane compound is admixed according to need with a variety of known additives including crease-proofing agents, flame retardants, antistatic agents, antioxidants, antiseptic agents, rustproofing agents and others each in a limited amount.

The procedure for the treatment of a fabric material with a fabric-finishing composition containing the inventive organopolysiloxane compound is performed in the following manner though not particularly limitative thereto. Firstly, a working liquid is prepared by diluting the aqueous emulsion composition of the inventive organopolysiloxane compound with water to have an adequate content of the organopolysiloxane compound therein suitable for the particular object of fabric treatment. The fabric material to be treated with the composition is coated with the working liquid in a conventional method such as dip coating, spray coating and roller coating. The coating amount naturally depends on several factors including the kind of the fabric material, particular object of the fabric treatment and so on but it is usual that the amount of the organopolysiloxane compound picked up on the fabric material is in the range from 0.01 to 10% by weight based on the dry weight of the fabric material. The fabric material thus coated with the liquid composition is then dried by heating at a temperature in the range from 100 to 150° C. for 2 to 5 minutes, for example, in a hot-air circulation oven depending on the types of the fibers forming the fabric material.

The type of the fibers forming the fabric material to be treated with the fabric-finishing composition of the inventive organopolysiloxane compound is not particularly limitative but includes natural fibers such as cotton, silk, linen, wool, angora and mohair and synthetic fibers such as polyesters, nylons, acrylics and spandexes. The fibers can be not only in the basic form such as filaments, staples, tows, strands and threads but also in the fabricated form of woven cloths, knit bodies, waddings and non-woven fabrics.

In the waterproofing treatment of a paperboard, which is made mainly from a cellulosic material, the paperboard is coated with a working emulsion prepared by diluting the aqueous emulsion composition of the inventive organopolysiloxane compound with water by a suitable coating method such as spray coating and dip coating followed by a heat treatment for drying at a temperature in the range from 100 to 150° C. for 3 to 30 minutes. The content of the organopolysiloxane compound in the above mentioned working emulsion is preferably in the range from 0.1 to 2% by weight. This is because, when the content of the organopolysiloxane compound in the working emulsion is too low, the paperboard coated with the emulsion cannot be imparted with a full waterproofing effect as a matter of course while, when the content of the organopolysiloxane compound in the working emulsion exceeds the above mentioned upper limit, a decrease is resulted in the adhesive bonding strength between the thus treated paperboard and the surface of the core board of hydrated gypsum.

In the following, the present invention is described in more detail by way of Examples, which, however, never limit the scope of the invention in any way. The values of viscosity given in the following description are all those obtained by the measurement at 25° C.

EXAMPLE 1

Into a glass flask of 3 liter capacity were introduced 1000 g of an aminoalkyl group-containing organopolysiloxane having a viscosity of 1700 centistokes and expressed by the structural formula

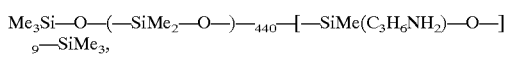

in which Me is a methyl group, and 1000 g of isopropyl alcohol to form a uniform solution by agitating at room temperature for 10 minutes with an anchor-blade stirrer rotating at 80 rpm followed by addition of 26 g of maleic anhydride and further continued agitation at room temperature for 15 hours with the stirrer rotating at 100 rpm. Thereafter, the reaction mixture was freed from isopropyl alcohol by distillation at 80° C. for 3 hours under a reduced pressure to give 994 g of a modified organopolysiloxane product having a viscosity of 25,000 centistokes and expressed by the structural formula

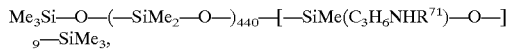

in which Me is a methyl group and $R^{71}$ is a carboxyethenylcarbonyl group of the formula —CO—CH=CH—CO—OH.

A 350 g portion of the thus obtained modified organopolysiloxane compound was admixed with 40 g of a polyoxyethylene (10 moles addition of ethylene oxide) tridecyl ether having an HLB value of 13.6 and 4.7 g of a 30% by weight aqueous solution of a sodium polyoxyethylene (5 moles addition of ethylene oxide) tridecyl ether sulfate followed by addition of 50 g of deionized water and high-speed agitation for 15 minutes with a Planetary Mixer to give a milk white, highly viscous emulsion, which was diluted by the addition of 555.3 g of deionized water and agitated for 15 minutes with a homomixer rotating at 2000 rpm to give a milk white emulsion. This aqueous emulsion exhibited good storage stability without separation into phases even after storage at 25° C. for 30 days or longer.

A 30 g portion of this emulsion was diluted by the addition of 1020 g of deionized water to serve as a working emulsion for fabric treatment in which a first test piece of a 65/35 polyester/cotton mixed-spun broadcloth and a second test piece of a cotton broadcloth after a treatment with a fluorescent dye were respectively dipped each for 2 minutes followed by squeezing in a squeeze ratio of 100% by using a roller squeezer and a two-step heat treatment first at 100° C. for 2 minutes for drying and then at 150° C. for 2 minutes for a heat treatment.

The first test piece cloth after the heat treatment above was subjected to an organoleptic evaluation test of softness in touch feeling by three expert panel members who were requested to report the results of their evaluation in three ratings of Good, Fair and Poor. The results reported by them for this test piece were all Good.

The second test piece cloth was subjected to a further heat treatment at 200° C. for 2 minutes to effect accelerated yellowing and the yellowness of the test piece was measured by using a colorimetric color-difference tester (Model ZE2000, manufactured by Nippon Denshoku Kogyo Co.) to give a b-value of −7.1, a smaller value of the b-value indicating higher whiteness of the test piece and less susceptibility to yellowing.

As a blank test for the purpose of control, the same two broadcloth test pieces were subjected to the organoleptic touch feeling test for softness and accelerated yellowing test in the same manner as above excepting for replacement of the aqueous organopolysiloxane emulsion with deionized water as such. The results of the touch feeling test by the three panel members were all Poor although no problem in yellowing was noted by the colorimetric test with the same b-value of −7.1 as in the above.

EXAMPLE 2

The experimental procedure was substantially the same as in Example 1 excepting for replacement of 26 g of maleic anhydride with 27 g of succinic anhydride to give 1013 g of a modified organopolysiloxane compound having a viscosity of 75,000 centistokes and expressed by the structural formula

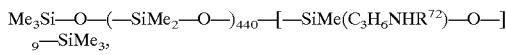

In which Me is a methyl group and $R^{72}$ is a carboxyethylcarbonyl group of the formula —CO—CH$_2$CH$_2$—CO—OH. The aqueous emulsion of this modified organopolysiloxane compound had storage stability as good as that in Example 1.

The results of the organoleptic touch feeling test for softness of the first test piece cloth reported by the three panel members were all Good. The colorimetric yellowing test of the second test piece cloth gave a b-value of −7.0.

EXAMPLE 3

The experimental procedure was substantially the same as in Example 1 excepting for replacement of 26 g of maleic anhydride with 30 g of glutaric anhydride to give 997 g of a modified organopolysiloxane compound having a viscosity of 88,000 centistokes and expressed by the structural formula

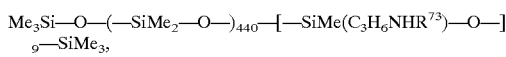

In which Me is a methyl group and $R^{73}$ is a carboxypropylcarbonyl group of the formula —CO—CH$_2$CH$_2$CH$_2$—CO—OH. The aqueous emulsion of this modified organopolysiloxane compound had storage stability as good as that in Example 1.

The results of the organoleptic touch feeling test for softness of the first test piece cloth reported by the three panel members were all Good. The colorimetric yellowing test of the second test piece cloth gave a b-value of −6.9.

EXAMPLE 4

The experimental procedure was substantially the same as in Example 1 excepting for replacement of the starting aminoalkyl group-containing organopolysiloxane with the same amount of another aminoalkyl group-containing organopolysiloxane having a viscosity of 1850 centistokes and expressed by the structural formula

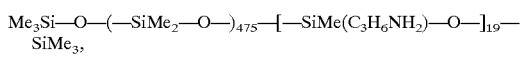

in which Me is a methyl group, and increase of the amount of maleic anhydride from 26 g to 49 g to obtain 1015 g of a modified organopolysiloxane compound having a viscosity of 170,000 centistokes and expressed by the structural formula

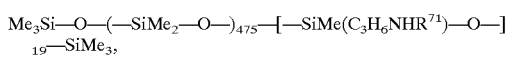

In which Me is a methyl group and $R^{71}$ has the same meaning as defined in Example 1. The aqueous emulsion of this modified organopolysiloxane compound had storage stability as good as that in Example 1.

The results of the organoleptic touch feeling test for softness of the first test piece cloth reported by the three panel members were all Good. The calorimetric yellowing test of the second test piece cloth gave a b-value of −7.0.

EXAMPLE 5

The experimental procedure was substantially the same as in Example 1 excepting for replacement of the starting aminoalkyl group-containing organopolysiloxane with the same amount of another aminoalkyl group-containing organopolysiloxane having a viscosity of 2000 centistokes and expressed by the structural formula

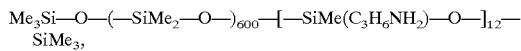

in which Me is a methyl group, to obtain 972 g of a modified organopolysiloxane compound having a viscosity of 300,000 centistokes and expressed by the structural formula

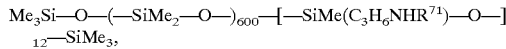

In which Me is a methyl group and $R^{71}$ has the same meaning as defined in Example 1. The aqueous emulsion of this modified organopolysiloxane compound had storage stability as good as that in Example 1.

The results of the organoleptic touch feeling test for softness of the first test piece cloth reported by the three panel members were all Good. The calorimetric yellowing test of the second test piece cloth gave a b-value of −6.9.

EXAMPLE 6

The experimental procedure was substantially the same as in Example 1 excepting for replacement of the starting aminoalkyl group-containing organopolysiloxane with the same amount of another aminoalkyl group-containing organopolysiloxane having a viscosity of 250 centistokes and expressed by the structural formula

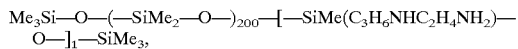

in which Me is a methyl group, and a decrease in the amount of maleic anhydride from 26 g to 13 g to obtain 982 g of a modified organopolysiloxane compound having a viscosity of 52,000 centistokes and expressed by the structural formula

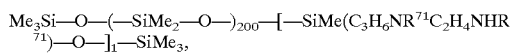

In which Me is a methyl group and $R^{71}$ has the same meaning as defined in Example 1. The aqueous emulsion of this modified organopolysiloxane had storage stability as good as that in Example 1.

The results of the organoleptic touch feeling test for softness of the first test piece cloth reported by the three panel members were all Good. The calorimetric yellowing test of the second test piece cloth gave a b-value of −6.8.

EXAMPLE 7

The experimental procedure was substantially the same as in Example 1 excepting for replacement of the starting aminoalkyl group-containing organopolysiloxane with the same amount of another aminoalkyl group-containing organopolysiloxane having a viscosity of 60 centistokes and expressed by the structural formula

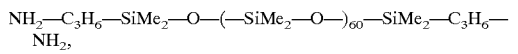

in which Me is a methyl group, and an increase in the amount of maleic anhydride from 26 g to 43 g to obtain 988 g of a modified organopolysiloxane compound having a viscosity of 9000 centistokes and expressed by the structural formula

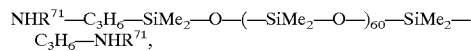

In which Me is a methyl group and $R^{71}$ has the same meaning as defined in Example 1. The aqueous emulsion of this modified organopolysiloxane compound had storage stability as good as that in Example 1.

The results of the organoleptic touch feeling test for softness of the first test piece cloth reported by the three panel members were all Good. The calorimetric yellowing test of the second test piece cloth gave a b-value of −7.0.

COMPARATIVE EXAMPLE 1

An aqueous organopolysiloxane emulsion was prepared in substantially the same emulsification procedure as in Example 1 excepting for replacement of the modified organopolysiloxane emulsified in Example 1 with the same amount of the starting aminoalkyl group-containing organopolysiloxane having a viscosity of 1700 centistokes before the reaction with maleic anhydride.

The evaluation tests of this aqueous emulsion as a fabric-finishing agent were undertaken in the same manner as in Example 1. The results of the organoleptic touch feeling test for softness of the first test piece cloth reported by the three panel members were all Good but the calorimetric yellowing test of the second test piece cloth gave a b-value of −6.1.

COMPARATIVE EXAMPLE 2

An aqueous organopolysiloxane emulsion was prepared in substantially the same emulsification procedure as in Example 1 excepting for replacement of the modified organopolysiloxane emulsified in Example 1 with the same amount of the starting aminoalkyl group-containing organopolysiloxane having a viscosity of 1850 centistokes used in Example 4 before the reaction with maleic anhydride.

The evaluation tests of this aqueous emulsion as a fabric-finishing agent were undertaken in the same manner as in Example 1. The results of the organoleptic touch feeling test for softness of the first test piece cloth reported by the three panel members were all Good but the calorimetric yellowing test of the second test piece cloth gave a b-value of −5.7.

COMPARATIVE EXAMPLE 3

An aqueous organopolysiloxane emulsion was prepared in substantially the same emulsification procedure as in Example 1 excepting for replacement of the modified organopolysiloxane emulsified in Example 1 with the same amount of the starting aminoalkyl group-containing organopolysiloxane having a viscosity of 2000 centistokes used in Example 5.

The evaluation tests of this aqueous emulsion as a fabric-finishing agent were undertaken in the same manner as in Example 1. The results of the organoleptic touch feeling test for softness of the first test piece cloth reported by the three panel members were all Good but the calorimetric yellowing test of the second test piece cloth gave a b-value of −5.8.

COMPARATIVE EXAMPLE 4

An aqueous organopolysiloxane emulsion was prepared in substantially the same emulsification procedure as in Example 1 excepting for replacement of the modified organopolysiloxane emulsified in Example 1 with the same amount of the starting aminoalkyl group-containing organopolysiloxane having a viscosity of 250 centistokes used in Example 6.

The evaluation tests of this aqueous emulsion as a fabric-finishing agent were undertaken in the same manner as in Example 1. The results of the organoleptic touch feeling test for softness of the first test piece cloth reported by the three panel members were Good by two members and Fair by the other member but the colorimetric yellowing test of the second test piece cloth gave a b-value of −6.0.

COMPARATIVE EXAMPLE 5

An aqueous organopolysiloxane emulsion was prepared in substantially the same emulsification procedure as in Example 1 excepting for replacement of the modified organopolysiloxane emulsified in Example 1 with the same amount of the starting aminoalkyl group-containing organopolysiloxane having a viscosity of 60 centistokes used in Example 7.

The evaluation tests of this aqueous emulsion as a fabric-finishing agent were undertaken in the same manner as in Example 1. The results of the organoleptic touch feeling test for softness of the first test piece cloth reported by the three panel members were Fair by two members and Good by the other member but the colorimetric yellowing test of the second test piece cloth gave a b-value of −6.2.

EXAMPLE 8

The same aqueous organopolysiloxane emulsion as prepared and used in Example 1 for fabric treatment was employed and evaluated as a waterproofing agent of paperboards for plasterboard covering in the following manner.

Thus, the aqueous emulsion was diluted with deionized water to have an organopolysiloxane content of 0.5% by weight and the thus prepared working emulsion was uniformly applied by using a paper gauze onto a surface of a 200 mm by 50 mm wide piece of a paperboard having a thickness of 0.3 mm followed by drying under heating at 130° C. for 5 minutes and measurement of the weight $W_1$.

The surface-treated test piece of paperboard prepared in the above described manner was put onto a water surface with the waterproof-treated surface facing downwardly and kept floating on the water surface at room temperature for 1 minute to be taken up followed by removal of water drops on the surface and immediate measurement of the weight $W_2$. The water absorption in % by weight as a measure of the waterproofness of the paperboard was calculated by the equation:

water absorption, $\% = 100 \times (W_2 - W_1)/W_1$.

The water absorption of the paperboard waterproofed in the above described manner was 20%.

EXAMPLE 9

The evaluation test of an aqueous emulsion of a modified organopolysiloxane as a waterproofing agent of paperboards was undertaken in just the same manner as in Example 8 excepting for replacement of the aqueous emulsion of the modified organopolysiloxane prepared in Example 1 with another aqueous emulsion prepared in Example 2.

Water absorption of the paperboard waterproofed in the same manner as in Example 8 was 25%.

EXAMPLE 10

The evaluation test of an aqueous emulsion of a modified organopolysiloxane as a waterproofing agent of paperboards was undertaken in just the same manner as in Example 8 excepting for replacement of the aqueous emulsion of the modified organopolysiloxane prepared in Example 1 with another aqueous emulsion prepared in Example 3.

Water absorption of the paperboard waterproofed in the same manner as in Example 8 was 21%.

EXAMPLE 11

The evaluation test of an aqueous emulsion of a modified organopolysiloxane as a waterproofing agent of paperboards was undertaken in just the same manner as in Example 8 excepting for replacement of the aqueous emulsion of the modified organopolysiloxane prepared in Example 1 with another aqueous emulsion prepared in Example 4.

Water absorption of the paperboard waterproofed in the same manner as in Example 8 was 18%.

EXAMPLE 12

The evaluation test of an aqueous emulsion of a modified organopolysiloxane as a waterproofing agent of paperboards was undertaken in just the same manner as in Example 8 excepting for replacement of the aqueous emulsion of the modified organopolysiloxane prepared in Example 1 with another aqueous emulsion prepared in Example 5.

Water absorption of the paperboard waterproofed in the same manner as in Example 8 was 22%.

EXAMPLE 13

The evaluation test of an aqueous emulsion of a modified organopolysiloxane as a waterproofing agent of paperboards was undertaken in just the same manner as in Example 8 excepting for replacement of the aqueous emulsion of the modified organopolysiloxane prepared in Example 1 with another aqueous emulsion prepared in Example 6.

Water absorption of the paperboard waterproofed in the same manner as in Example 8 was 26%.

EXAMPLE 14

The evaluation test of an aqueous emulsion of a modified organopolysiloxane as a waterproofing agent of paperboards was undertaken in just the same manner as in Example 8 excepting for replacement of the aqueous emulsion of the modified organopolysiloxane prepared in Example 1 with another aqueous emulsion prepared in Example 7.

Water absorption of the paperboard waterproofed in the same manner as in Example 8 was 25%.

EXAMPLE 15

The evaluation test of an aqueous emulsion of a modified organopolysiloxane compound as a waterproofing agent of paperboards was undertaken in just the same manner as in Example 8 except that the aquepus emulsion of the modified organopolysiloxane compound was prepared by replacing the polyoxyethylene tridecyl ether and the sodium polyoxyethylene tridecyl ether sulfate as the surface active agents each with the same amount of a polyoxyethylene (11 moles addition of ethylene oxide) nonylphenyl ether having an HLB value of 13.7 and a sodium polyoxyethylene (3 moles addition of ethylene oxide) nonylphenyl ether sulfate, respectively. The thus prepared aqueous emulsion had storage stability as good as that in Example 1.

Water absorption of the paperboard waterproofed in the same manner as in Example 8 was 19%.

EXAMPLE 16

The evaluation test of an aqueous emulsion of a modified organopolysiloxane compound as a waterproofing agent of paperboards was undertaken in just the same manner as in Example 8 except that the aqueous emulsion of a modified organopolysiloxane compound was prepared in the following manner. Thus, 500 g of the modified organopolysiloxane compound prepared in Example 1 were admixed with 300 g of a 10% by weight aqueous solution of sodium lauryl sulfate and the mixture was agitated for 15 minutes with a homomixer rotating at 500 rpm to give an emulsion which was further admixed with 200 g of deionized water and again agitated for 15 minutes with a homomixer rotating at 2000 rpm. The thus prepared aqueous emulsion had storage stability as good as that in Example 1.

Water absorption of the paperboard waterproofed with the above prepared aqueous emulsion in the same manner as in Example 8 was 20%.

COMPARATIVE EXAMPLE 6

The evaluation test of an aqueous emulsion of an organopolysiloxane as a waterproofing agent of paperboards was undertaken in just the same manner as in Example 8 except that the aqueous emulsion of an organopolysiloxane was prepared by replacing the modified organopolysiloxane prepared in Example 1 with the same amount of the starting aminoalkyl group-containing organopolysiloxane having a viscosity of 1700 centistokes before the reaction with maleic anhydride.

Water absorption of the paperboard waterproofed with the aqueous emulsion prepared above in the same manner as in Example 8 was 37%.

COMPARATIVE EXAMPLE 7

The evaluation test of an aqueous emulsion of an organopolysiloxane as a waterproofing agent of paperboards was undertaken in just the same manner as in Example 8 except that the aqueous emulsion of an organopolysiloxane was prepared by replacing the modified organopolysiloxane prepared in Example 1 with the same amount of a dimethylpolysiloxane having a viscosity of 10,100 centistokes and expressed by the structural formula $$Me_3Si-O-(-SiMe_2-O-)_{800}-SiMe_3,$$

in which Me is a methyl group.

Water absorption of the paperboard waterproofed with the above prepared aqueous emulsion in the same manner as in Example 8 was 65%.

COMPARATIVE EXAMPLE 8

The evaluation test of an aqueous emulsion of an organopolysiloxane as a waterproofing agent of paperboards was undertaken in just the same manner as in Example 8 except that the aqueous emulsion of an organopolysiloxane was prepared by replacing the modified organopolysiloxane compound prepared in Example 1 with the same amount of a glycidyl group-containing dimethylpolysiloxane compound having a viscosity of 19,000 centistokes and expressed by the structural formula $$Me_3Si-O-(-SiMe_2-O-)_{900}-[-SiMe(C_3H_6-O-G)-O-]_{19}-SiMe_3,$$

In which Me is a methyl group and G is a glycidyl group.

Water absorption of the paperboard waterproofed with the above prepared aqueous emulsion in the same manner as in Example 8 was 40%.

What is claimed is:

1. A waterproofing method of a paperboard for plasterboard covering, comprising:

(a) coating at least one of the surfaces of a paperboard with an aqueous emulsion composition comprising:
   (A) water as a medium;
   (B) a surface active agent dissolved in water as the medium; and
   (C) a modified organopolysiloxane compound in the form of an emulsion dispersed in water as the medium, wherein the modified organopolysiloxane compound has a chemical structure represented by the general formula:

$$R^3-SiR^1{}_2-O-(-SiR^1{}_2-O-)_m-(-SiR^1R^2-O-)_n-SiR^1{}_2-R^3,$$

wherein:

$R^1$ is, each independently from the others, an unsubstituted or substituted monovalent hydrocarbon group having 1 to 20 carbon atoms;

$R^2$ is, each independently from the others, a monovalent organic group represented by the general formula $-R^4(NR^5CH_2CH_2)_aNR^6R^7$, $R^4$ being a divalent hydrocarbon group having 1 to 6 carbon atoms, $R^5$ and $R^6$ each being, independently from the other, a hydrogen atom, monovalent hydrocarbon group having 1 to 6 carbon atoms or R7 which is a monovalent organic group of the formula $-CO-R^8-CO-OH$, $R^8$ being a divalent hydrocarbon group having 2 to 10 carbon atoms, and the subscript a being 0 or a positive integer not exceeding 4;

$R^3$ is a hydroxyl group, hydrocarbyloxy group having 1 to 6 carbon atoms, $R^1$ or $R_2$;

the subscript m is a positive number in the range from 10 to 1000; and the subscript n is 0 or a positive number not exceeding 100 with the proviso that, when the subscript n is equal to 0, at least one of the groups denoted by $R^3$ is $R^2$;

of which the content of the organopolysiloxane compound is in the range from 0.1 to 2% by weight; and (b) heating the paperboard coated with the aqueous emulsion composition.

2. A waterproofing method according to claim 1, wherein the heating is conducted at a temperature in the range from 100 to 150° C. for 3 to 30 minutes.

* * * * *